May 5, 1942.
R. E. CARTER
2,282,143
CLUTCH
Filed May 6, 1940
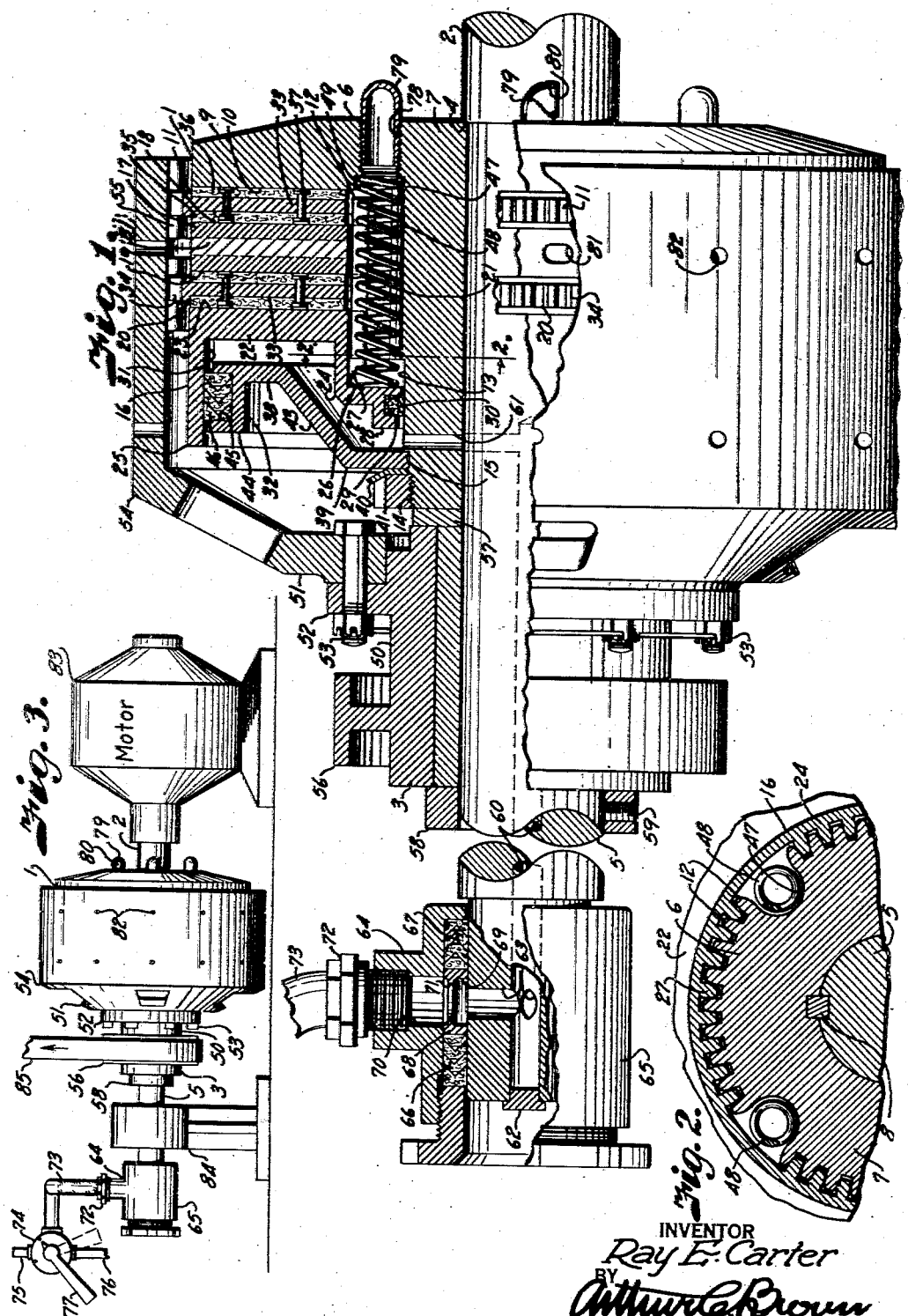
INVENTOR
Ray E. Carter
BY
Arthur C. Brown
ATTORNEY Patented May 5, 1942

2,282,143

UNITED STATES PATENT OFFICE 2,282,143

CLUTCH

Ray E. Carter, Tulsa, Okla., assignor to Unit Rig & Equipment Company, Tulsa, Okla., a partnership composed of Jerry Underwood, Hugh Chancey, William Guier, and Ray E. Carter Application May 6, 1940, Serial No. 333,570

5 Claims. (Cl. 192—85)

This invention relates to a coupling device, particularly a friction clutch suitable for heavy duty oil field equipment, and has for its principal object to provide a clutch wherein the driving and driven elements are engaged and retained in driving relation by direct application of a fluid pressure medium, thereby simplifying the clutch structure and eliminating the usual clutch operating levers.

Other objects of the invention are to provide a clutch actuating mechanism requiring no adjustments to compensate for wear of the clutch parts; to provide a clutch construction which is self-cooling and self-clearing of foreign particles that ordinarily interfere with driving contact of the clutch elements; to provide a clutch construction wherein the driving elements may be caused to gradually pick up driving contact with the driven elements thereby avoiding load shocks; and to provide a clutch construction which is quiet in operation and perfectly balanced.

In accomplishing these and other objects of the invention, I have provided improved details of structure, the preferred form of which is illustrated in the accompanying drawing, wherein:

Fig. 1 is a side view of a clutch constructed in accordance with the present invention, a part of which is shown in longitudinal section to better illustrate the construction thereof.

Fig. 2 is a detail cross-sectional view on the line 2—2 of Fig. 1.

Fig. 3 is a diagrammatic view showing one type of clutch installation.

Referring more in detail to the drawing:

1 designates a clutch constructed in accordance with the present invention, and which is adapted to operatively connect a driving member 2 with a driven member 3. In the illustrated instance the driving member is shown as a shaft having an annular shoulder 4 formed by a reduced extension 5 thereof and on which the clutch is supported. The clutch includes a driving element 6 comprising a hub 7 rigidly secured on the reduced portion of the driving shaft by a key 8 and so positioned that one end of the hub engages the stop shoulder 4 as clearly shown in Fig. 1.

The driving element also comprises a back plate 9 which, in the present instance, is integral with the hub and has an annular contact face 10 on the hub side thereof to be engaged by a driven element 11 of the clutch, later described. The hub 7 is provided with a plurality of spaced splines or teeth 12 extending longitudinally of the axis of shaft rotation but terminating short of the terminal end of the hub to provide a cylindrical sealing face 13 and a reduced threaded portion 14 forming an annular shoulder 15 therewith. Slidably mounted on the hub are one or more floating clutch elements cooperating with the back plate 9. In the illustrated instance I have shown two floating elements, 16 and 17. The element 17 comprises a ring-like plate having annular contact faces 18 and 19 on the respective sides thereof similar to the contact face 10 on the back plate to engage the driven clutch element 11 and a second driven element 20 respectively. The inner circumference of the ring-like plate has spaced teeth 21 interengaged with the teeth 12 of the hub so that the plate is slidably and rotatably connected with the driving element 6. The other floating element 16 includes an annular plate portion 22 having a contact face 23 engaging the other side face of the driven element 20, a hub portion 24 encircling the hub of the driving element, and a laterally extending perimetrical flange 25. The hub 24 has an annular recess 26 opening from the side carrying the contact face 23 to accommodate the tooth portion of the hub 7. The annular wall of the recess 26 carries a plurality of teeth 27 slidably engaged with the teeth 12 of the hub so that the floating elements 16 and 17 rotate as a unit with the driving element 6. The hub 24 also includes a collar portion 28 encircling the sealing face of the hub, and is provided on its inner periphery with a packing recess 29 in which is contained a packing element 30 sealingly engaged with the sealing face of the hub 7 as clearly shown in Fig. 1. The annular flange 25, plate portion 22, and hub 24 cooperate to form a cylinder 31 to mount a piston 32, later described.

The driven elements 11 and 20 each includes ring-like plates 33 having inner circumferences to turn freely over the teeth 12 of the hub 7 and having outer circumferences extending beyond the outer peripheries of the driving elements to carry a plurality of teeth 34. The plates 33 are preferably provided with clutch facings 35 and 36 secured thereto by fastening devices such as rivets 37.

The piston 32 includes a head 38 having an inner offset portion 39 retained in engagement with the shoulder 15 by a lock washer 40 and a jam-nut 41 which is threaded on the portion 13 of the hub, previously described. The portion 38 is connected with the outer offset portion 42 by a conical portion 43 to accommodate the hub portion of the cylinder. Carried on the outer periphery of the head is a flange 44 having an annular groove 45 containing a packing element 46 sealingly engaged with the inner face of the cylinder 31. The space between the piston and head of the cylinder is thus sealed to provide a pressure chamber for the introduction of a pressure medium to effect movement of the floating clutch elements into driving relation with the driven clutch elements, as later described.

In order to move the floating clutch elements in the opposite direction to release driving contact, the periphery of the tooth portion of the hub is provided with a plurality of longitudinal grooves or recesses 47 each receiving a coil spring 48, each having one end engaging the bottom of the recess 26 in the hub of the floating element 16 and its opposite end engaging a recess 49 provided in the back plate. The driven member of the clutch includes a hub 50 loosely supported on the shaft and carries a spider 51 that is secured to a flange 52 of the hub by fastening devices 53. The spider 51 carries a drum 54 extending over the driving and driven elements of the clutch. The drum is provided on its inner face with a plurality of longitudinal teeth 55 interengaging the teeth 34 of the driven elements 11 and 20 so that when the driving elements are engaged with the driven elements, the driven member 3 is driven through the tooth engagement.

The mechanism to be actuated may be connected with the driven member in any suitable manner, but in the drawing the hub 50 is shown as provided with a pulley 56. In order to limit longitudinal movement of the driven member on the shaft, the shaft carries a thrust washer 57 engageable between the hub 50 and the hub 7 and a stop collar 58 which is retained against the opposite end of the hub 50 by a set-screw 59. In order to conduct the pressure medium to the pressure chamber, the shaft has an axial bore 60 opening from the outer end thereof and terminating in radial bores 61 extending through the hub 7 and opening into the pressure chamber as shown in Fig. 1. The outer end of the bore 60 is closed by a plug 62 and connects through radial bores 63 with an inlet connection 64.

The air inlet connection includes a casing 65 sleeved upon a reduced extension of the shaft and which has a counterbore to receive packing rings 66 and 67 on the respective sides of the radial bores 63, the packings being separated by a spacing ring 68 having an annular groove 69 connecting the radial bores 63 with an air inlet port 70 through an opening 71 in the ring 68. The air inlet port is connected by a suitable fitting 72 with a flexible connection 73 leading to a control valve 74 which selectively admits a pressure medium from a source of supply indicated by the pipe 75 into the pressure chamber or to exhaust the pressure medium from the pressure chamber through an exhaust connection 76, the valve being manipulated by a suitable lever as indicated at 77.

In order to cool the intermediate clutch members and to effect self-cleaning of the clutch of foreign material tending to lodge between the contact faces thereof, the back plate is provided with a plurality of threaded openings 78 carrying a plurality of scoops 79 having inlet openings 80 facing the direction of clutch rotation so that air is collected thereby and directed through the respective spring grooves for discharge between the faces of the clutch elements, when the clutch elements are disengaged, to dislodge any foreign material tending to collect on the contact faces. In order to enhance the cooling effect, the intermediate floating plate elements are preferably provided with a plurality of radial passageways 81 through which a portion of the collected air is discharged. The cooling air, upon exhausting from between the driven elements of the clutch, is discharged from the interior of the driving member, through openings 82 in the drum 54.

While the clutch may be used in various installations, one installation is shown in Fig. 3 wherein the driving shaft 2 is shown as directly connected and supported by the armature shaft of a motor 83 while the opposite end of the shaft is carried in a pillow bearing 84. Operating over the pulley 56 is a belt 85 to deliver power of the motor to an actuated mechanism (not shown).

When the clutch is assembled and installed as described, with the valve set to exhaust position, the springs 48 are effective in shifting the floating element 16 of the clutch away from the driven element 20 so as to effect release of the floating element 17 from engagement with the driving element 11, which in turn is freed from driving engagement with the back plate 9 so that the back plate 9, intermediate floating plate 17, cylinder 31, and piston 32 may rotate freely without effecting drive of the driven member. When the valve is shifted to its other position, a pressure medium such as air is admitted from the pipe 75, flexible connection 73, port 70, radial bores 63, axial bore 60, and radial passageways 61 into the pressure chamber to exert pressure between the head of the cylinder and piston, thereby shifting the driving and floating elements 16 and 17 and driven elements 11 and 20 of the clutch into contact with each other to effect rotation of the driven member.

Rotation of the back plate causes the scoops 79 to pick up air and discharge it through the radial passageways 81 in the intermediate floating member of the clutch to effect cooling thereof. When the air pressure is exhausted from the piston chamber and the springs are effective to separate the driving and driven elements, a part of the cooling air is discharged between the contact faces to clear them of any foreign particles lodged thereon.

From the foregoing it is obvious that I have provided a clutch operated and retained in operation by the direct application of a pressure medium, thereby eliminating the various levers, toggles, and the like ordinarily used in clutch mechanisms. It is obvious that the operating medium, being elastic, provides for gradual engagement of the clutch so as to avoid shock when the motor picks up the driving load.

While I have illustrated the clutch as including three driving elements and two driven elements, it is obvious that a greater number of intermediate driving and driven elements may be employed or a single driving element may be used in connection with the floating cylinder and back plate without departing from the spirit of the invention.

What I claim and desire to secure by Letters Patent is:

1. A clutch of the character described including, driving and driven members, means supporting said members in coaxial alignment, one of said members having spring seats and a hub portion provided with longitudinal recesses registering with said spring seats, means interposed between said members and having frictional contact faces to connect said members in driving relation with each other when axial pressure is applied to effect engaging contact of said faces, pressure applying members one comprising a cylinder having an end wall supported on said hub and having a lateral peripheral flange forming a piston chamber and the other a piston in said chamber and mounted on said hub, a packing carried by one of said pressure applying members and having sealing contact with said hub, means anchoring the other of said pressure applying members on said hub, a packing element for sealing the piston member relatively to said peripheral flange and to cooperate with said packing and said anchoring means for sealing a pressure chamber formed between said pressure applying members, means for admitting a pressure medium between said pressure applying members, and an expansion spring in each recess and having one end engaging a registering spring seat and the other the movable pressure applying member for disengaging said contact faces upon exhaust of the pressure medium.

2. A clutch of the character described including, a hub member, a drum member, one of said members having longitudinally extending spring receiving recesses, means supporting said members in coaxial alignment, a backing flange on the member having the recesses and provided with spring seats registering with the recesses, means interposed between said members and having frictional contact faces to connect said members in driving relation with each other when axial pressure is applied to effect engaging contact of said faces, means for applying said pressure including a cylinder having a head mounted on one of said members opposite the backing flange and having a lateral peripheral flange forming a piston chamber, a piston in said chamber and mounted upon the member carrying the cylinder, means slidably sealing the cylinder with its mounting member, means anchoring the piston directly on said mounting member, springs in said recesses each having one end engaging a seat in the backing flange and the other said cylinder to yieldably retain said contact faces in spaced relation, and means for admitting a pressure medium between said piston and cylinder to effect engagement of said contact faces.

3. A clutch of the character described including, a hub member having a peripheral backing flange at one end thereof and an annular stop shoulder at the other end, splines extending longitudinally of said hub, spring sockets interposed between said splines, a drum member, means supporting said drum and hub members in coaxial alignment, means interposed between the splines of said hub and the drum and having contact faces to connect the hub and drum members in driving relation with each other, a cylinder having a head cooperating with the backing flange and having an offset hub portion forming a recess to accommodate the splines of said hub member, teeth in said recess engaging said splines, means sealing said hub member with said offset hub portion of the cylinder, a piston in said cylinder having an end wall offset to accommodate the offset hub of the cylinder and engaging said annular shoulder, means for retaining said offset portion of the piston in engagement with said annular shoulder, means for admitting a pressure medium between the piston and the cylinder to move the cylinder against said contact faces, and springs in said sockets having one end engaging against said backing flange and the other against said offset hub portion of the cylinder to relieve pressure on said contact faces.

4. A clutch of the character described including, a hub member having a peripheral backing flange at one end thereof and an annular stop shoulder at the other end, splines extending longitudinally of said hub, spring sockets interposed between said splines, a drum, means supporting said drum and hub in coaxial alignment, means interposed between the splines of said hub and the drum and having contact faces to connect the hub and drum in driving relation with each other, a cylinder having a head cooperating with the backing flange and having a recess to accommodate the splines of said hub, teeth in said recess engaging said splines, means sealing said hub with the head of the cylinder, a piston in said cylinder having a head engaging said annular stop shoulder of the hub, means for clamping the head of the piston against said annular shoulder, means for admitting a pressure medium between the piston and the cylinder to move the cylinder to effect engagement of said contact faces, and springs in said sockets having one end engaging against said backing flange and the other against the bottom of the recess to relieve pressure on said contact faces.

5. A clutch of the character described including, a hub member, a drum member, one of said members having longitudinally extending spring receiving recesses, means supporting said members in coaxial alignment, a backing flange on the member having the recesses and provided with spring seats registering with the recesses, means interposed between said members and having frictional contact faces to connect said members in driving relation with each other when axial pressure is applied to effect engaging contact of said faces, means for applying said pressure including a cylinder having a head mounted on one of said members opposite the backing flange and having a lateral peripheral flange forming a piston chamber, a piston in said chamber and mounted upon the member carrying the cylinder, means slidably sealing the cylinder with its mounting member, means anchoring the piston directly on said mounting member, springs in said recesses each having one end engaging a seat in the backing flange and the other said cylinder to yieldably retain said contact faces in spaced relation, and means for admitting a pressure medium between said piston and cylinder to effect engagement of said contact faces, said pressure applying means having portions offset from said connecting means to accommodate springs of greater length than the combined width of said connecting means.

RAY E. CARTER.